US006670783B2

(12) United States Patent
Waehner et al.

(10) Patent No.: US 6,670,783 B2
(45) Date of Patent: Dec. 30, 2003

(54) METHOD AND APPARATUS FOR IMPROVED MOTOR CONTROL THROUGH CURRENT/VELOCITY CORRECTION

(75) Inventors: Glenn Waehner, Fresno, CA (US); William Eric Hamilton, Clovis, CA (US)

(73) Assignee: Pelco, Clovis, CA (US)

( * ) Notice: Subject to any disclaimer, the term of this patent is extended or adjusted under 35 U.S.C. 154(b) by 9 days.

(21) Appl. No.: 09/998,816

(22) Filed: Oct. 31, 2001

(65) Prior Publication Data

US 2003/0080708 A1 May 1, 2003

(51) Int. Cl.[7] .............................. H02P 8/00; H02P 5/28
(52) U.S. Cl. ..................... 318/696; 318/700; 318/727
(58) Field of Search ............................ 318/696, 685, 318/804, 700, 567, 727, 438; 388/904, 825, 828, 829, 833, 838, 839–841, 848, 854, 855

(56) References Cited

U.S. PATENT DOCUMENTS

| | | | | |
|---|---|---|---|---|
| 4,008,425 A | * | 2/1977 | Dickey | 318/799 |
| 4,052,648 A | | 10/1977 | Nola | |
| 4,090,118 A | * | 5/1978 | Smith, Jr. | 318/567 |
| 4,160,940 A | | 7/1979 | Wolf | |
| 4,344,025 A | | 8/1982 | Okuyama et al. | |
| 4,394,606 A | | 7/1983 | Woerwag | |
| 4,477,761 A | | 10/1984 | Wolf | |
| 4,546,293 A | | 10/1985 | Peterson et al. | |
| 4,742,281 A | | 5/1988 | Nakano et al. | |
| 4,767,279 A | * | 8/1988 | Dourdeville et al. | 417/18 |
| 4,969,756 A | | 11/1990 | Villec et al. | |
| 5,005,207 A | | 4/1991 | Grave et al. | |
| 5,245,256 A | | 9/1993 | Cassat et al. | |
| 5,341,453 A | | 8/1994 | Hill | |
| 5,534,763 A | | 7/1996 | Williams et al. | |
| 5,566,145 A | * | 10/1996 | Sasaki | 369/30.17 |
| 6,081,091 A | * | 6/2000 | Mitchell et al. | 318/685 |
| 6,111,384 A | * | 8/2000 | Stagnitto | 318/602 |
| 6,140,793 A | * | 10/2000 | Carr et al. | 318/696 |
| 6,211,642 B1 | * | 4/2001 | Holdaway | 318/696 |
| 6,441,579 B1 | * | 8/2002 | Van Lydegraf et al. | 318/696 |
| 6,452,357 B1 | * | 9/2002 | Jahkonen | 318/721 |
| 2002/0008491 A1 | * | 1/2002 | Aoshima | 318/696 |
| 2002/0039010 A1 | * | 4/2002 | Plasz et al. | 318/567 |

OTHER PUBLICATIONS

A DMOS 3A, 55V, H-Bridge: The LMD 18200, National Semiconductor, App. Note 694, Dec. 1999.

* cited by examiner

Primary Examiner—Robert E. Nappi
Assistant Examiner—Patrick Miller
(74) Attorney, Agent, or Firm—Mark D. Miller

(57) ABSTRACT

The present invention provides a method and apparatus, including a processor and software incorporating a table that contains sets of pre-determined correction values that are used to supply different amounts of power to an electric stepper motor when the motor is operating at different speeds. Use of the correction values in the table allows power to be supplied to the motor in differing amounts that are approximately the same as the power actually required by the motor at different motor speeds or ranges of speeds.

30 Claims, 11 Drawing Sheets

| $\theta°$ | $\sin(\theta)$ | Step | $\cos(\theta)$ | Step |
|---|---|---|---|---|
| 0/360 | 0.000 | 0 | 1.000 | 191 |
| 45 | 0.707 | 31 | 0.707 | 223 |
| 90 | 1.000 | 63 | 0.000 | 0 |
| 135 | 0.707 | 95 | −0.707 | 31 |
| 180 | 0.000 | 127 | −1.000 | 63 |
| 225 | −0.707 | 159 | −0.707 | 95 |
| 270 | −1.000 | 191 | 0.000 | 127 |
| 315 | −0.707 | 223 | 0.707 | 159 |
| 360/0 | 0.000 | 0 | 1.000 | 191 |

Condensed $\sin(\theta)$, $\cos(\theta)$ table, with step values for a 256 entry table.

Fig. 1

Clockwise sinusoidal waveforms for Phases A and B

| Δ | Frequency | Steps/quadrant | Distance/ustep |
|---|---|---|---|
| 0 | 0.0000 Hz | ∞ | 0.000000° |
| 1 | 39.0625 Hz | 64.0 | 0.014063° |
| 2 | 78.1250 Hz | 32.0 | 0.028125° |
| 3 | 117.1875 Hz | 21.3 | 0.042187° |
| 4 | 156.2500 Hz | 16.0 | 0.056250° |
| 5 | 195.3125 Hz | 12.8 | 0.070313° |
| 6 | 234.3750 Hz | 10.7 | 0.084375° |
| 7 | 273.4375 Hz | 9.1 | 0.098437° |
| 8 | 312.5000 Hz | 8.0 | 0.112500° |
| 9 | 351.5625 Hz | 7.1 | 0.126562° |
| 10 | 390.6250 Hz | 6.4 | 0.140625° |
| 11 | 429.6875 Hz | 5.8 | 0.154688° |
| 12 | 468.7500 Hz | 5.3 | 0.168750° |
| 13 | 507.8125 Hz | 4.9 | 0.182813° |
| 14 | 546.8750 Hz | 4.6 | 0.196875° |
| 15 | 585.9375 Hz | 4.3 | 0.210938° |

Table of Pseudo-sine wave generation frequencies with increasing integer $T_{lookup}$ rates.

Fig. 3

| IV Correction Factors ||||||||||||
|---|---|---|---|---|---|---|---|---|---|---|---|---|
| Speed range → | | 0, 1 | 2 | 3 | 4 | 5 | 6 | 7 | 8 | 9 | 10 | 11 → 15 |
| $\sin(\theta)$ | $\sin(\theta) \times 255$ | 0.35 | 0.39 | 0.455 | 0.473 | 0.566 | 0.649 | 0.731 | 0.814 | 0.897 | 0.98 | 1.0 |
| 0.000000 | 0 | 0 | 0 | 0 | 0 | 0 | 0 | 0 | 0 | 0 | 0 | 0 |
| 0.024541 | 6 | 2 | 2 | 3 | 3 | 3 | 4 | 4 | 5 | 5 | 6 | 6 |
| 0.049068 | 13 | 5 | 5 | 6 | 6 | 7 | 8 | 10 | 11 | 12 | 13 | 13 |
| 0.073565 | 19 | 7 | 7 | 9 | 9 | 11 | 12 | 14 | 15 | 17 | 19 | 19 |
| 0.098017 | 25 | 9 | 10 | 11 | 11 | 14 | 16 | 18 | 20 | 22 | 25 | 25 |
| 0.122411 | 31 | 11 | 12 | 14 | 15 | 18 | 20 | 23 | 25 | 28 | 30 | 31 |
| 0.146730 | 37 | 13 | 14 | 17 | 18 | 21 | 24 | 27 | 30 | 33 | 36 | 37 |
| 0.170962 | 44 | 15 | 17 | 20 | 21 | 25 | 29 | 32 | 36 | 39 | 43 | 44 |
| 0.195090 | 50 | 18 | 20 | 23 | 24 | 28 | 32 | 37 | 41 | 45 | 49 | 50 |
| 0.219101 | 56 | 20 | 22 | 25 | 26 | 32 | 36 | 41 | 46 | 50 | 55 | 56 |
| 0.242980 | 62 | 22 | 24 | 28 | 29 | 35 | 40 | 45 | 50 | 56 | 61 | 62 |
| 0.266713 | 68 | 24 | 27 | 31 | 32 | 38 | 44 | 50 | 55 | 61 | 67 | 68 |
| 0.290285 | 74 | 26 | 29 | 34 | 35 | 42 | 48 | 54 | 60 | 66 | 73 | 74 |
| 0.313682 | 80 | 28 | 31 | 36 | 38 | 45 | 52 | 58 | 65 | 72 | 78 | 80 |
| 0.336890 | 86 | 30 | 34 | 39 | 41 | 49 | 56 | 63 | 70 | 77 | 84 | 86 |
| 0.359895 | 92 | 32 | 36 | 42 | 44 | 52 | 60 | 67 | 75 | 83 | 90 | 92 |
| 0.382683 | 98 | 34 | 38 | 45 | 46 | 55 | 64 | 72 | 80 | 88 | 96 | 98 |
| 0.405241 | 103 | 36 | 40 | 47 | 49 | 58 | 67 | 75 | 84 | 92 | 101 | 103 |
| 0.427555 | 109 | 38 | 43 | 50 | 52 | 62 | 71 | 80 | 89 | 98 | 107 | 109 |
| 0.449611 | 115 | 40 | 45 | 52 | 54 | 65 | 75 | 84 | 94 | 103 | 113 | 115 |
| 0.471397 | 120 | 42 | 47 | 55 | 57 | 68 | 78 | 88 | 98 | 108 | 118 | 120 |
| 0.492898 | 126 | 44 | 49 | 57 | 60 | 71 | 82 | 92 | 103 | 113 | 123 | 126 |
| 0.514103 | 131 | 46 | 51 | 60 | 62 | 74 | 85 | 96 | 107 | 118 | 128 | 131 |
| 0.534998 | 136 | 48 | 53 | 62 | 64 | 77 | 88 | 99 | 111 | 122 | 133 | 136 |
| 0.555570 | 142 | 50 | 55 | 65 | 67 | 80 | 92 | 104 | 116 | 127 | 139 | 142 |
| 0.575808 | 147 | 51 | 57 | 67 | 70 | 83 | 95 | 107 | 120 | 132 | 144 | 147 |
| 0.595699 | 152 | 53 | 59 | 69 | 72 | 86 | 99 | 111 | 124 | 136 | 149 | 152 |
| 0.615232 | 157 | 55 | 61 | 71 | 74 | 89 | 102 | 115 | 128 | 141 | 154 | 157 |
| 0.634393 | 162 | 57 | 63 | 74 | 77 | 92 | 105 | 118 | 132 | 145 | 159 | 162 |
| 0.653173 | 167 | 58 | 65 | 76 | 79 | 95 | 108 | 122 | 136 | 150 | 164 | 167 |
| 0.671559 | 171 | 60 | 67 | 78 | 81 | 97 | 111 | 125 | 139 | 153 | 168 | 171 |
| 0.689541 | 176 | 62 | 69 | 80 | 83 | 100 | 114 | 129 | 143 | 158 | 172 | 176 |
| 0.707107 | 180 | 63 | 70 | 82 | 85 | 102 | 117 | 132 | 147 | 161 | 176 | 180 |
| 0.724247 | 185 | 65 | 72 | 84 | 88 | 105 | 120 | 135 | 151 | 166 | 181 | 185 |
| 0.740951 | 189 | 66 | 74 | 86 | 89 | 107 | 123 | 138 | 154 | 170 | 185 | 189 |
| 0.757209 | 193 | 68 | 75 | 88 | 91 | 109 | 125 | 141 | 157 | 173 | 189 | 193 |
| 0.773010 | 197 | 69 | 77 | 90 | 93 | 112 | 128 | 144 | 160 | 177 | 193 | 197 |
| 0.788346 | 201 | 70 | 78 | 91 | 95 | 114 | 130 | 147 | 164 | 180 | 197 | 201 |
| 0.803208 | 205 | 72 | 80 | 93 | 97 | 116 | 133 | 150 | 167 | 184 | 201 | 205 |
| 0.817585 | 208 | 73 | 81 | 95 | 98 | 118 | 135 | 152 | 169 | 187 | 204 | 208 |
| 0.831470 | 212 | 74 | 83 | 96 | 100 | 120 | 138 | 155 | 173 | 190 | 208 | 212 |
| 0.844854 | 215 | 75 | 84 | 98 | 102 | 122 | 140 | 157 | 175 | 193 | 211 | 215 |
| 0.857729 | 219 | 77 | 85 | 100 | 104 | 124 | 142 | 160 | 178 | 196 | 215 | 219 |
| 0.870087 | 222 | 78 | 87 | 101 | 105 | 126 | 144 | 162 | 181 | 199 | 218 | 222 |
| 0.881921 | 225 | 79 | 88 | 102 | 106 | 127 | 146 | 164 | 183 | 202 | 221 | 225 |
| 0.893224 | 228 | 80 | 89 | 104 | 108 | 129 | 148 | 167 | 186 | 205 | 223 | 228 |
| 0.903989 | 231 | 81 | 90 | 105 | 109 | 131 | 150 | 169 | 188 | 207 | 226 | 231 |
| 0.914210 | 233 | 82 | 91 | 106 | 110 | 132 | 151 | 170 | 190 | 209 | 228 | 233 |
| 0.923880 | 236 | 83 | 92 | 107 | 112 | 134 | 153 | 173 | 192 | 212 | 231 | 236 |
| 0.932993 | 238 | 83 | 93 | 108 | 113 | 135 | 154 | 174 | 194 | 213 | 233 | 238 |
| 0.941544 | 240 | 84 | 94 | 109 | 114 | 136 | 156 | 175 | 195 | 215 | 235 | 240 |
| 0.949528 | 242 | 85 | 94 | 110 | 114 | 137 | 157 | 177 | 197 | 217 | 237 | 242 |
| 0.956940 | 244 | 85 | 95 | 111 | 115 | 138 | 158 | 178 | 199 | 219 | 239 | 244 |
| 0.963776 | 246 | 86 | 96 | 112 | 116 | 139 | 160 | 180 | 200 | 221 | 241 | 246 |
| 0.970031 | 247 | 86 | 96 | 112 | 117 | 140 | 160 | 181 | 201 | 222 | 242 | 247 |
| 0.975702 | 249 | 87 | 97 | 113 | 118 | 141 | 162 | 182 | 203 | 223 | 244 | 249 |
| 0.980785 | 250 | 88 | 98 | 114 | 118 | 142 | 162 | 183 | 204 | 224 | 245 | 250 |
| 0.985278 | 251 | 88 | 98 | 114 | 119 | 142 | 163 | 183 | 204 | 225 | 246 | 251 |
| 0.989177 | 252 | 88 | 98 | 115 | 119 | 143 | 164 | 184 | 205 | 226 | 247 | 252 |
| 0.992480 | 253 | 89 | 99 | 115 | 120 | 143 | 164 | 185 | 206 | 227 | 248 | 253 |
| 0.995185 | 254 | 89 | 99 | 116 | 120 | 144 | 165 | 186 | 207 | 228 | 249 | 254 |
| 0.997290 | 254 | 89 | 99 | 116 | 120 | 144 | 165 | 186 | 207 | 228 | 249 | 254 |
| 0.998795 | 255 | 89 | 99 | 116 | 121 | 144 | 165 | 186 | 208 | 229 | 250 | 255 |
| 0.999699 | 255 | 89 | 99 | 116 | 121 | 144 | 165 | 186 | 208 | 229 | 250 | 255 |
| 1.000000 | 255 | 89 | 99 | 116 | 121 | 144 | 165 | 186 | 208 | 229 | 250 | 255 |
| 0.999699 | 255 | 89 | 99 | 116 | 121 | 144 | 165 | 186 | 208 | 229 | 250 | 255 |

Continued on the next page.

Fig. 4

| Continued from the previous page. | | | | | | | | | | | | |
|---|---|---|---|---|---|---|---|---|---|---|---|---|
| | IV Correction Factors | | | | | | | | | | | |
| | Speed range → | 0, 1 | 2 | 3 | 4 | 5 | 6 | 7 | 8 | 9 | 10 | 11 → 15 |
| sin(θ) | sin(θ) × 255 | 0.35 | 0.39 | 0.455 | 0.473 | 0.566 | 0.649 | 0.731 | 0.814 | 0.897 | 0.98 | 1.0 |
| 0.998795 | 255 | 89 | 99 | 116 | 121 | 144 | 165 | 186 | 208 | 229 | 250 | 255 |
| 0.997290 | 254 | 89 | 99 | 116 | 120 | 144 | 165 | 186 | 207 | 228 | 249 | 254 |
| 0.995185 | 254 | 89 | 99 | 116 | 120 | 144 | 165 | 186 | 207 | 228 | 249 | 254 |
| 0.992480 | 253 | 89 | 99 | 115 | 120 | 143 | 164 | 185 | 206 | 227 | 248 | 253 |
| 0.989177 | 252 | 88 | 98 | 115 | 119 | 143 | 164 | 184 | 205 | 226 | 247 | 252 |
| 0.985278 | 251 | 88 | 98 | 114 | 119 | 142 | 163 | 183 | 204 | 225 | 246 | 251 |
| 0.980785 | 250 | 88 | 98 | 114 | 118 | 142 | 162 | 183 | 204 | 224 | 245 | 250 |
| 0.975702 | 249 | 87 | 97 | 113 | 118 | 141 | 162 | 182 | 203 | 223 | 244 | 249 |
| 0.970031 | 247 | 86 | 96 | 112 | 117 | 140 | 160 | 181 | 201 | 222 | 242 | 247 |
| 0.963776 | 246 | 86 | 96 | 112 | 116 | 139 | 160 | 180 | 200 | 221 | 241 | 246 |
| 0.956940 | 244 | 85 | 95 | 111 | 115 | 138 | 158 | 178 | 199 | 219 | 239 | 244 |
| 0.949528 | 242 | 85 | 94 | 110 | 114 | 137 | 157 | 177 | 197 | 217 | 237 | 242 |
| 0.941544 | 240 | 84 | 94 | 109 | 114 | 136 | 156 | 175 | 195 | 215 | 235 | 240 |
| 0.932993 | 238 | 83 | 93 | 108 | 113 | 135 | 154 | 174 | 194 | 213 | 233 | 238 |
| 0.923880 | 236 | 83 | 92 | 107 | 112 | 134 | 153 | 173 | 192 | 212 | 231 | 236 |
| 0.914210 | 233 | 82 | 91 | 106 | 110 | 132 | 151 | 170 | 190 | 209 | 228 | 233 |
| 0.903989 | 231 | 81 | 90 | 105 | 109 | 131 | 150 | 169 | 188 | 207 | 226 | 231 |
| 0.893224 | 228 | 80 | 89 | 104 | 108 | 129 | 148 | 167 | 186 | 205 | 223 | 228 |
| 0.881921 | 225 | 79 | 88 | 102 | 106 | 127 | 146 | 164 | 183 | 202 | 221 | 225 |
| 0.870087 | 222 | 78 | 87 | 101 | 105 | 126 | 144 | 162 | 181 | 199 | 218 | 222 |
| 0.857729 | 219 | 77 | 85 | 100 | 104 | 124 | 142 | 160 | 178 | 196 | 215 | 219 |
| 0.844854 | 215 | 75 | 84 | 98 | 102 | 122 | 140 | 157 | 175 | 193 | 211 | 215 |
| 0.831470 | 212 | 74 | 83 | 96 | 100 | 120 | 138 | 155 | 173 | 190 | 208 | 212 |
| 0.817585 | 208 | 73 | 81 | 95 | 98 | 118 | 135 | 152 | 169 | 187 | 204 | 208 |
| 0.803208 | 205 | 72 | 80 | 93 | 97 | 116 | 133 | 150 | 167 | 184 | 201 | 205 |
| 0.788346 | 201 | 70 | 78 | 91 | 95 | 114 | 130 | 147 | 164 | 180 | 197 | 201 |
| 0.773010 | 197 | 69 | 77 | 90 | 93 | 112 | 128 | 144 | 160 | 177 | 193 | 197 |
| 0.757209 | 193 | 68 | 75 | 88 | 91 | 109 | 125 | 141 | 157 | 173 | 189 | 193 |
| 0.740951 | 189 | 66 | 74 | 86 | 89 | 107 | 123 | 138 | 154 | 170 | 185 | 189 |
| 0.724247 | 185 | 65 | 72 | 84 | 88 | 105 | 120 | 135 | 151 | 166 | 181 | 185 |
| 0.707107 | 180 | 63 | 70 | 82 | 85 | 102 | 117 | 132 | 147 | 161 | 176 | 180 |
| 0.689541 | 176 | 62 | 69 | 80 | 83 | 100 | 114 | 129 | 143 | 158 | 172 | 176 |
| 0.671559 | 171 | 60 | 67 | 78 | 81 | 97 | 111 | 125 | 139 | 153 | 168 | 171 |
| 0.653173 | 167 | 58 | 65 | 76 | 79 | 95 | 108 | 122 | 136 | 150 | 164 | 167 |
| 0.634393 | 162 | 57 | 63 | 74 | 77 | 92 | 105 | 118 | 132 | 145 | 159 | 162 |
| 0.615232 | 157 | 55 | 61 | 71 | 74 | 89 | 102 | 115 | 128 | 141 | 154 | 157 |
| 0.595699 | 152 | 53 | 59 | 69 | 72 | 86 | 99 | 111 | 124 | 136 | 149 | 152 |
| 0.575808 | 147 | 51 | 57 | 67 | 70 | 83 | 95 | 107 | 120 | 132 | 144 | 147 |
| 0.555570 | 142 | 50 | 55 | 65 | 67 | 80 | 92 | 104 | 116 | 127 | 139 | 142 |
| 0.534998 | 136 | 48 | 53 | 62 | 64 | 77 | 88 | 99 | 111 | 122 | 133 | 136 |
| 0.514103 | 131 | 46 | 51 | 60 | 62 | 74 | 85 | 96 | 107 | 118 | 128 | 131 |
| 0.492898 | 126 | 44 | 49 | 57 | 60 | 71 | 82 | 92 | 103 | 113 | 123 | 126 |
| 0.471397 | 120 | 42 | 47 | 55 | 57 | 68 | 78 | 88 | 98 | 108 | 118 | 120 |
| 0.449611 | 115 | 40 | 45 | 52 | 54 | 65 | 75 | 84 | 94 | 103 | 113 | 115 |
| 0.427555 | 109 | 38 | 43 | 50 | 52 | 62 | 71 | 80 | 89 | 98 | 107 | 109 |
| 0.405241 | 103 | 36 | 40 | 47 | 49 | 58 | 67 | 75 | 84 | 92 | 101 | 103 |
| 0.382683 | 98 | 34 | 38 | 45 | 46 | 55 | 64 | 72 | 80 | 88 | 96 | 98 |
| 0.359895 | 92 | 32 | 36 | 42 | 44 | 52 | 60 | 67 | 75 | 83 | 90 | 92 |
| 0.336890 | 86 | 30 | 34 | 39 | 41 | 49 | 56 | 63 | 70 | 77 | 84 | 86 |
| 0.313682 | 80 | 28 | 31 | 36 | 38 | 45 | 52 | 58 | 65 | 72 | 78 | 80 |
| 0.290285 | 74 | 26 | 29 | 34 | 35 | 42 | 48 | 54 | 60 | 66 | 73 | 74 |
| 0.266713 | 68 | 24 | 27 | 31 | 32 | 38 | 44 | 50 | 55 | 61 | 67 | 68 |
| 0.242980 | 62 | 22 | 24 | 28 | 29 | 35 | 40 | 45 | 50 | 56 | 61 | 62 |
| 0.219101 | 56 | 20 | 22 | 25 | 26 | 32 | 36 | 41 | 46 | 50 | 55 | 56 |
| 0.195090 | 50 | 18 | 20 | 23 | 24 | 28 | 32 | 37 | 41 | 45 | 49 | 50 |
| 0.170962 | 44 | 15 | 17 | 20 | 21 | 25 | 29 | 32 | 36 | 39 | 43 | 44 |
| 0.146730 | 37 | 13 | 14 | 17 | 18 | 21 | 24 | 27 | 30 | 33 | 36 | 37 |
| 0.122411 | 31 | 11 | 12 | 14 | 15 | 18 | 20 | 23 | 25 | 28 | 30 | 31 |
| 0.098017 | 25 | 9 | 10 | 11 | 12 | 14 | 16 | 18 | 20 | 22 | 25 | 25 |
| 0.073565 | 19 | 7 | 7 | 9 | 9 | 11 | 12 | 14 | 15 | 17 | 19 | 19 |
| 0.049068 | 13 | 5 | 5 | 6 | 6 | 7 | 8 | 10 | 11 | 12 | 13 | 13 |
| 0.024541 | 6 | 2 | 2 | 3 | 3 | 3 | 4 | 4 | 5 | 5 | 6 | 6 |

Fig. 4 (continued)

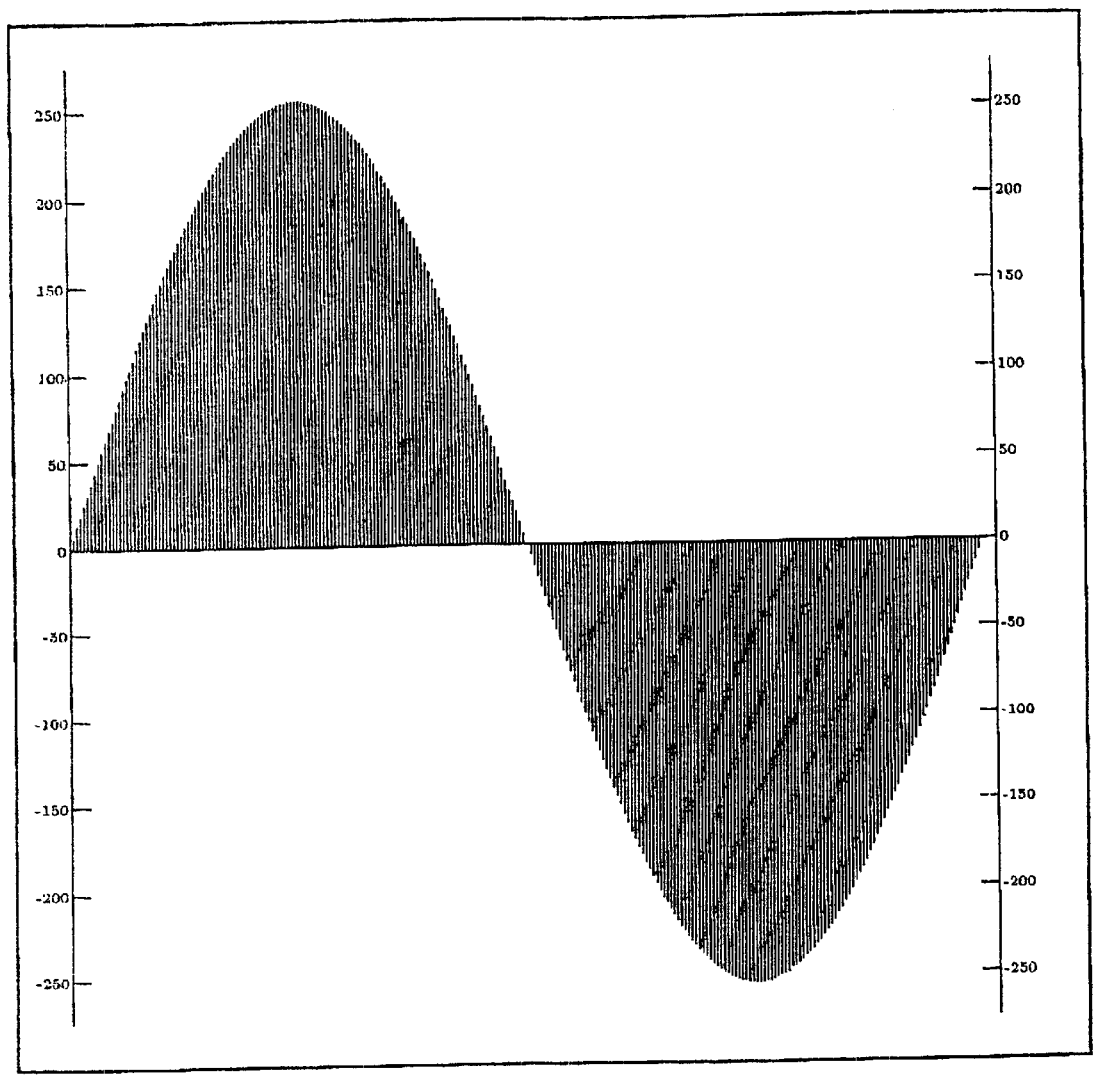
Figure 5. sin wave plot, Max = 255

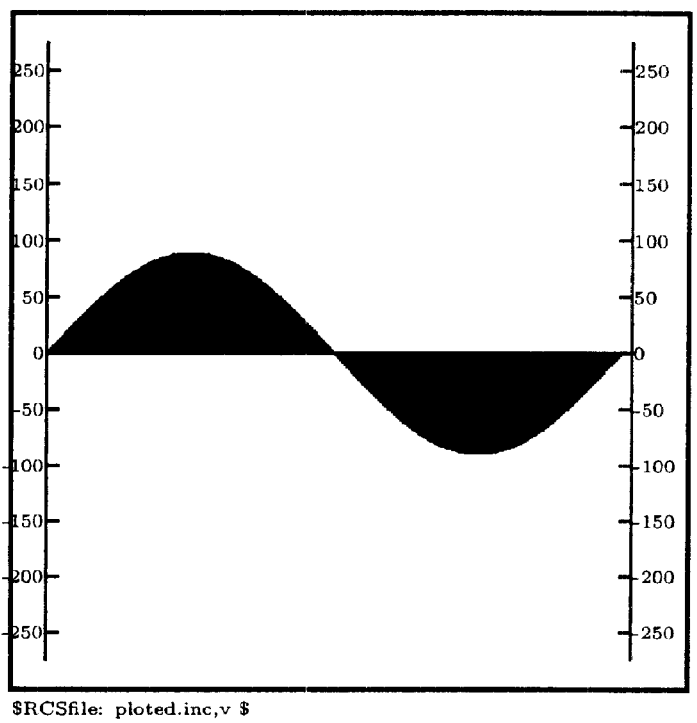
Figure 6, sin wave plot, Max = 255, scaled 0.35
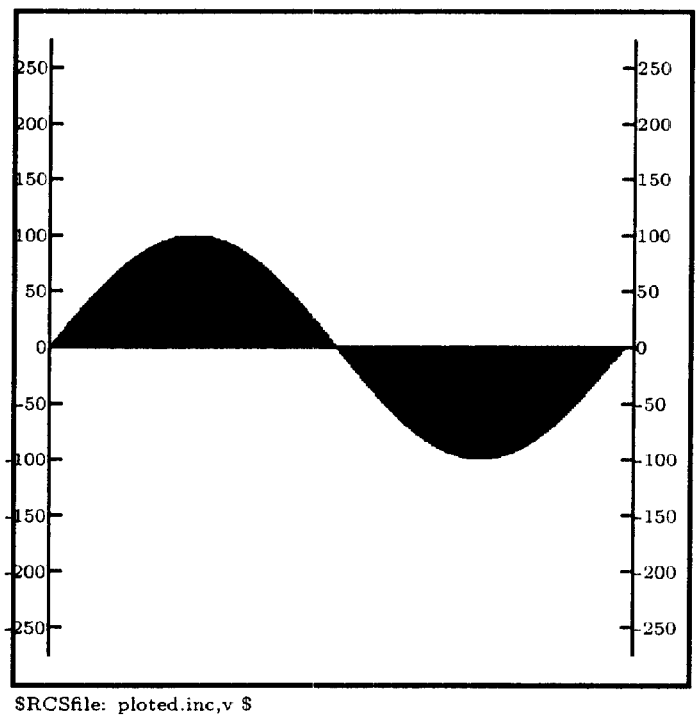
Figure 7, sin wave plot, Max = 255, scaled 0.39

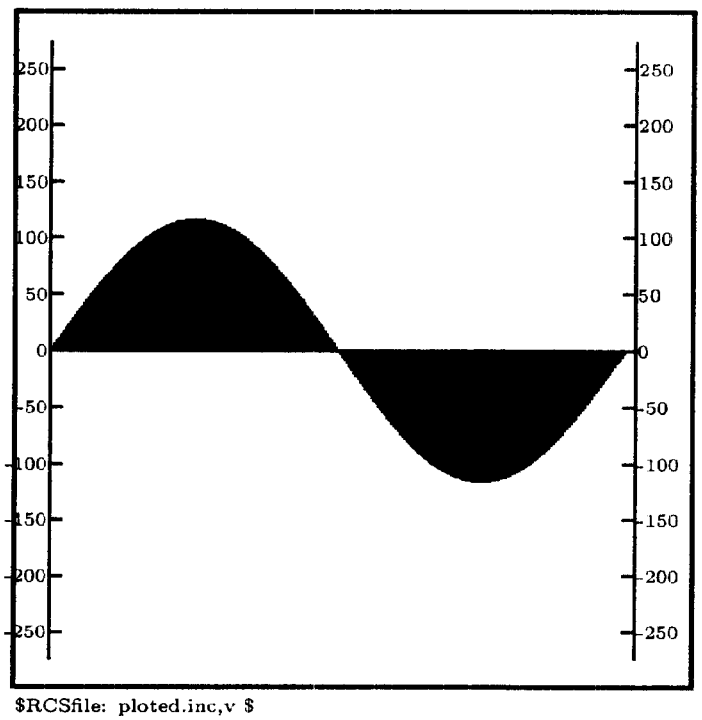
Figure 8, sin wave plot, Max = 255, scaled 0.455
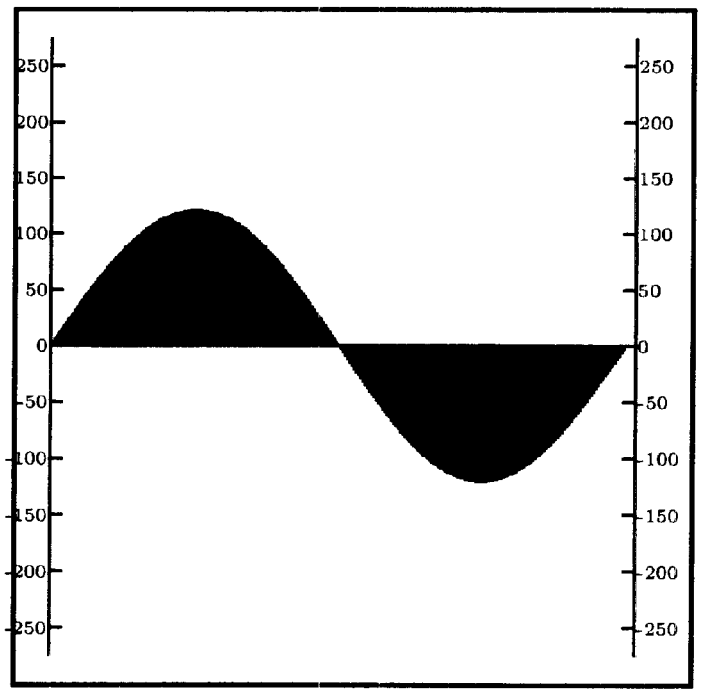
Figure 9, sin wave plot, Max = 255, scaled 0.473

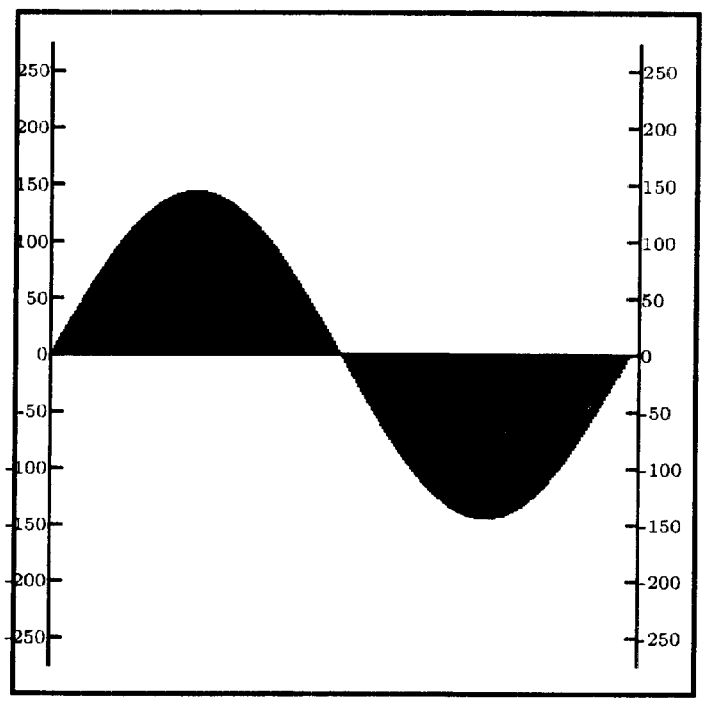
Figure 10, sin wave plot, Max = 255, scaled .566
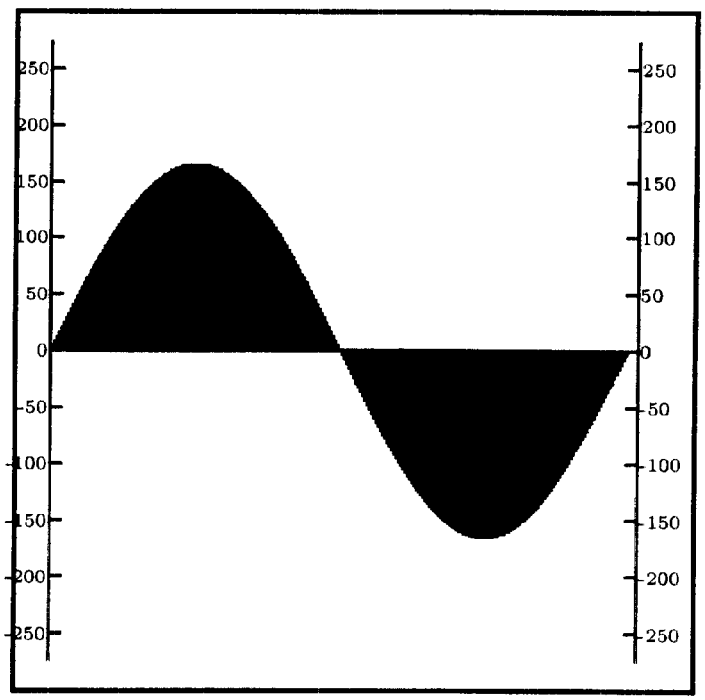
Figure 11, sin wave plot, Max = 255, scaled 0.649

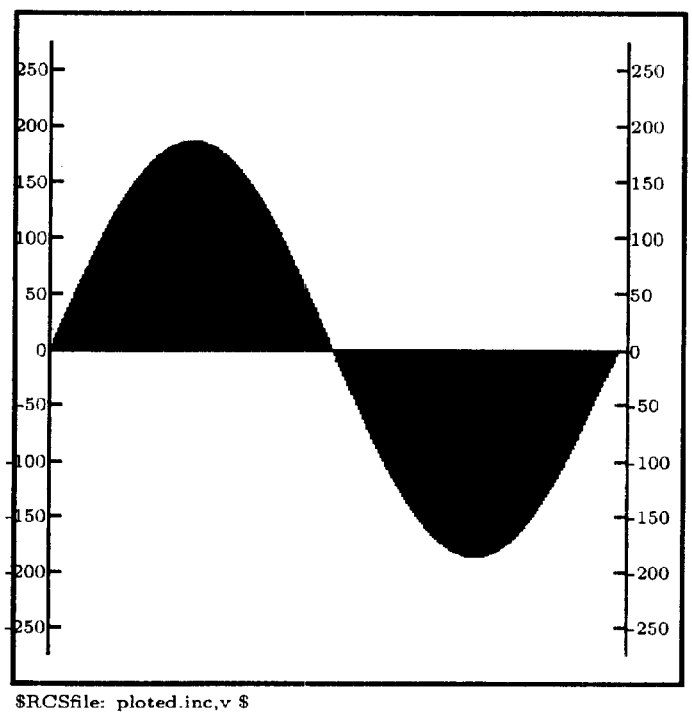
Figure 12, sin wave plot, Max = 255, scaled 0.731
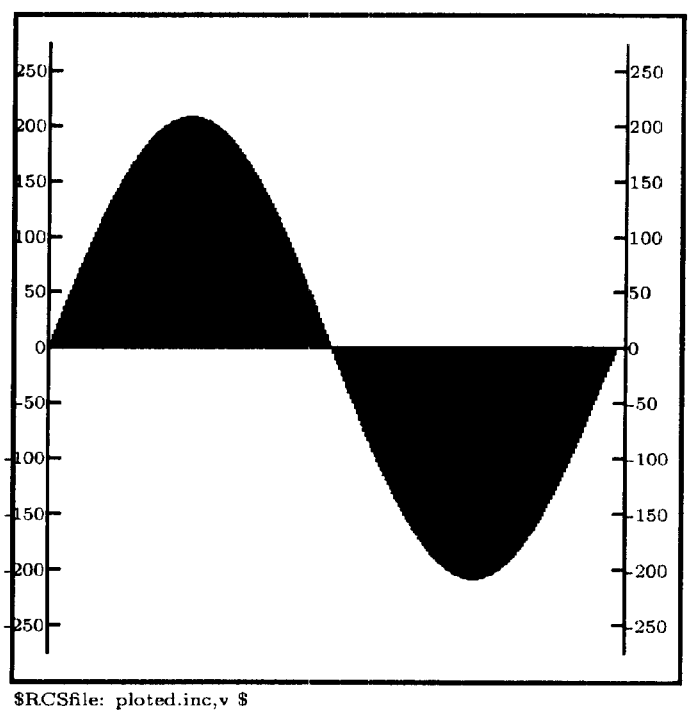
Figure 13, sin wave plot, Max = 255, scaled 0.814

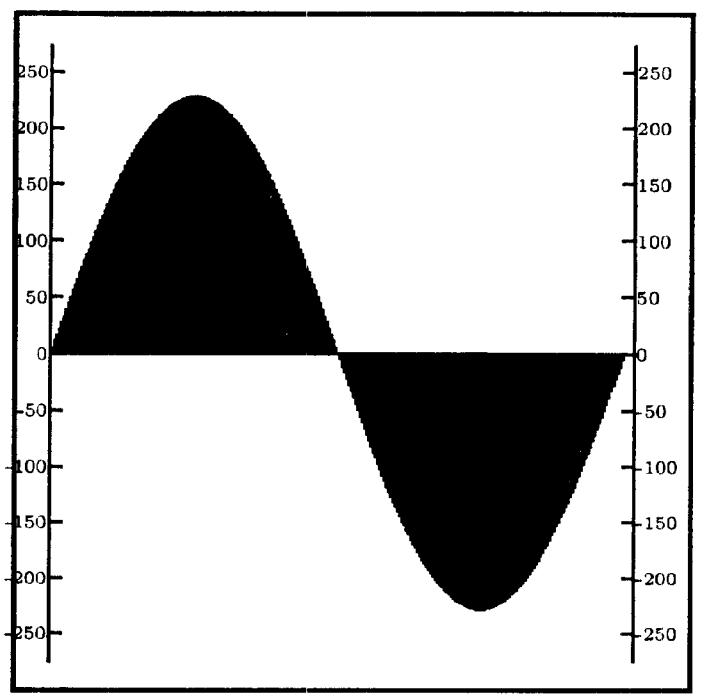
Figure 14, sin wave plot, Max = 255, scaled 0.897
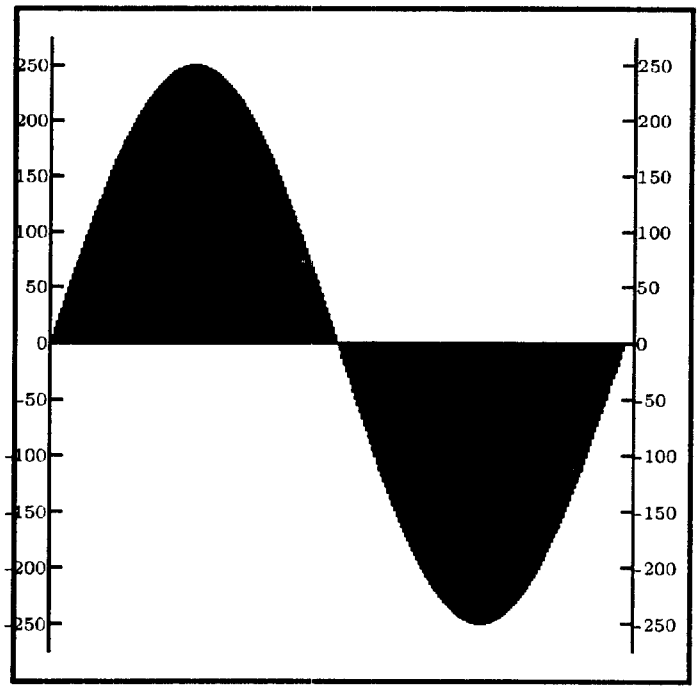
Figure 15, sin wave plot, Max = 255, scaled .98

METHOD AND APPARATUS FOR IMPROVED MOTOR CONTROL THROUGH CURRENT/VELOCITY CORRECTION

BACKGROUND OF THE INVENTION

1. Field of the Invention

The present invention relates generally to the efficient operation of variable speed stepper-type electric motors, and more particularly to a method for providing improved control of an electric stepper motor by varying the amount of power supplied to the motor at different speeds in relation to the amount of power required by the motor according to a pre-configured table, without relying on feedback from the motor itself.

2. Description of the Prior Art

Variable speed electric motors, particularly stepper motors, are employed in a wide variety of applications where precise movements are desired. A typical application of a variable speed motor is in a closed circuit television (CCTV) system where a surveillance camera unit is mounted on a movable base. Movement is imparted to the base (and hence to the camera) using one or more variable speed electric motors that cause the camera to scan, pan and/or tilt. It is common to use stepper motors in these applications because such motors are capable of providing the precise movements required by surveillance cameras.

A stepper motor's shaft has permanent magnets attached to it, together these are called the rotor. Around the body of the motor is a series of coils (windings) that create a magnetic field that interacts with the permanent magnets. When these coils are turned on and off the magnetic field causes the rotor to move. As the coils are turned on and off in a certain sequence the motor will rotate forward or reverse. This is called the phase pattern and there are several types that will cause the motor to turn.

To make a stepper motor rotate, the coils must be constantly turned on. If one coil of the motor is energized, the rotor will jump to that position and stay there resisting change. This energized coil pulls full current even though the motor is not turning. This ability to stay put at one position rigidly is an advantage of stepper motors. The torque at stand still is called the holding torque. Because stepper motors can be controlled by turning on and off coils, they are easy to control using digital computers. The computer simply energizes the coils in a certain pattern and the motor moves accordingly. At any given time the computer will know the position of the motor since the number of steps given can be stored.

When other than full power is applied to the coils, the rotor will move to intermediate positions. This is referred to as "micro-stepping" the motor. A common type of signal used for micro-stepping is a pair of orthogonally related pseudo-sine waves. Different actual pseudo-sine waves may be generated. Stepper motors are limited in the amount of torque they can produce in comparison with DC brush motor (this is the other common type of DC motor). Stepper motors are typically rated with a holding torque which is the amount of torque they can hold without slipping with the coils energized at the rated voltage. The holding torque is not the amount of torque they can actually turn. Stepper turning torque is a fraction of the rated holding torque.

Unlike brush motors whose torque increases with speed, steppers have more torque at lower speeds. Stepper motors also have a much lower maximum speed than a brush motor.

The stepper motor coils are typically rated for a particular voltage. The coils act as inductors when voltage is supplied to them. As such, the coils do not instantly draw their full current, and in fact may never reach full current at high stepping frequencies. The electromagnetic field produced by the coils is directly related to the amount of current they draw. The larger the electromagnetic field the more torque the motors have the potential of producing. The solution to increasing the torque is to ensure that the coils reach full current during each step. This is accomplished by increasing the voltage the coil is excited with while never exceeding the manufacturer's current rating. To accomplish this, some kind of current limiting scheme is necessary. A series resistor between the higher than rated power supply and the coil is common. (As current increases so will the voltage drop across the resistor and therefore limit the voltage across the coils and protect them from damage.)

Some level of power must be supplied to a stepper motor at all times, even when the rotor is in a stationary position. The direction of rotation of the motor rotor is determined by variably switching the amount and polarity of the power supplied across the motor windings. The speed (frequency) of rotation of rotor is determined in part by the amount of power delivered, but primarily by how quickly the supply of power to the motor coils is changed. The amount of power supplied may be varied by varying the amount of the voltage or by varying the amount of time that a fixed voltage is provided. The latter procedure is known as pulse width modulation (PWM).

A typical stepper motor has a given inductance based on the number of motor windings, with more/longer windings providing additional inductance. Additional windings are preferred because they allow for smoother operation and more strength, or torque, in the motor. Thus, a typical strong stepper motor will have a higher inductance than a weaker motor for equal amounts of current.

As an electric motor is operated, its speed (RPM or frequency) may be increased according to the needs of the application. The usable speed of a stepper motor is determined by available torque which is directly proportional to current driven through the motor. The current in the motor is limited by the resistance of the windings, the inductance of the windings, and the back EMF (electromotive force) of the motor. As the frequency of the applied power to the motor increases, so also does the reactance in the motor circuit, the reactance being a function of the inductance (i.e. size and number of windings) and the resistance of the motor itself. Thus, at higher speeds additional power must be supplied for proper operation (i.e. sufficient torque) in order to compensate for the increased reactance and back EMF. At lower speeds, there is less reactance, and less back EMF such that less power is required.

If too much power is supplied when back EMF is low (i.e. when the motor is moving at low speeds or is stationary), the motor will draw excessive current which may damage or shorten the life of the motor components. If the applied power is not increased when back EMF increases (i.e., as speed increases), there will be insufficient current flow, and the motor will not have enough power available to operate correctly (i.e., it will run under-power with diminished strength or torque).

Even when not moving, a typical stepper motor will continue to require a small amount of power in order to maintain its current position In surveillance camera applications, the motors operating the camera may be brought to a stationary position and left there for long periods of time (days, weeks or even months). Providing full power over such long periods of time to a stationary motor is wasteful and is likely to burn out motor components. It is estimated that on average, the amount of power required by a stepper motor in a CCTV application is between ¼ and ⅓ of the maximum power available. It is therefore desirable to limit the amount of power supplied to the motors operating a surveillance camera in relation to the amount of power required by the motors whether moving or not.

Many stepper motor manufacturers recommend that a particular current be provided to the motor for proper performance. It is typical for the current supplied to a stepper motor to be changed in accordance with the demands of the motor. However, in many surveillance camera applications as well as other applications, power is only available at one voltage level making it impossible to vary the level of current actually supplied to the motor. In some situations, the power supply may not be consistent resulting in variations in the available voltage.

In surveillance camera systems, it is also important to know the position of the camera at all times. This allows the camera operator to be aware of the direction the camera is currently pointed in, and to be able to move the camera to point in another direction if desired. In existing systems, feedback is received from the motors that move the camera in order to keep track of the camera's position. For example, U.S. Pat. No. 5,534,763 discloses a microprocessor and a software look-up table which compares instantaneous feedback information from the motor with target information to adjust the input to the motor. Such applications require the deployment of sensors in the motors and corresponding translation circuitry in the microprocessor controlling the motors. Elimination of these components would reduce cost and complexity, and make more of the microprocessor capacity available for other uses.

Because of the heavy demands made on microprocessors deployed to operate surveillance cameras, it is advantageous to eliminate as many unnecessary real time computations as possible to free up microprocessor resources for other uses. It is also advantageous, although not necessary, for efficient computer processing to use whole numbers.

It is therefore desirable to provide an inexpensive way to control the power supplied to the electric motors used to operate surveillance cameras in real time in relation to the variable speeds of the motors, particularly in situations where only one voltage level is available, without unduly taxing the camera's microprocessor such that the positions of the motors are known without requiring feedback from the motors themselves.

SUMMARY OF THE INVENTION

The present invention provides a method and apparatus, including a processor and software incorporating a table that contains sets of pre-determined correction values that are used to supply different amounts of power to an electric motor when the motor is operating at different speeds. Use of the correction values in the table allows power to be supplied to the motor in differing amounts that are approximately the same as the power actually required by the motor at different motor speeds or ranges of speeds. The table is established based on the characteristics of the motor (e.g. the number of windings, the inductance, the number of steps or sub-steps, etc.), the speeds (frequencies) at which the motor is expected to operate, and the amount of voltage and current available in the driving circuit for use by the motor. With this information, a table is generated which contains sets of correction values that correspond to different instantaneous speeds or ranges of speeds for the motor. By using the values in the table, particularly at low speeds, only the amount of power actually required by the motor is delivered to it.

It is possible to determine the approximate amount of power required and consumed by a stepper motor at increasing speeds. These factors are generated into a look-up table that is used in varying the time over which full power is applied to the motor, or in varying the amount of voltage applied to the motor, at different speeds.

In many cases, it is only possible to deliver either all or none of an available voltage to the motor. In such cases, variances in power are accomplished by varying the length of time that such full-voltage power is delivered (i.e., shorter or longer "pulses" of the same strength). This is known as pulse width modulation (PWM). In other cases, it may be possible to vary the amount of voltage delivered. In these cases, variable voltage amounts may be provided for the same lengths of time (i.e., variable strength but same-length "pulses") to accomplish the same result. Thus, the amount of power delivered is a function of the voltage supplied with the current and/or the length of time that it is delivered. Accordingly, by varying either the voltage or the time of delivery (or both), it is possible to change the amount of power delivered to the motor. The present invention is directed primarily toward varying the length of time that a full-voltage charge is delivered; however, the sets of correction values in the tables generated according to the present invention have equal application to situations where variable voltages are applied.

By supplying only the amount of power actually feqifed required by the motor, the motor is able to operate at full torque without wasting power or risking bum-out of motor components. This provides a high degree of accuracy in motor control such that the position of the motor may be known at all times without requiring feedback from the motor itself The present invention is also capable of sensing and compensating for fluctuations in the available power in the drive circuit.

The amount of force available to a motor is determined by the strength of its magnetic fields and is proportional to the electric current flowing through the windings. In electrical circuits involving inductance (or capacitance, or both), the amount of "work" done is related to a power factor (real power/apparent power) of the system. The closer to unity (i.e., the closer to 1) that the power factor is, then the more efficient the system is. Some systems attempt to control the power factor to obtain good motor control. In the present invention, the amplitude of the driving signal is modified to get the same effect. There are many different ways that the driving signal may be modified to provide good motor control, including any appropriate mathematical operation (addition, subtraction, multiplication, and/or division) performed on the driving signal. However, each such implementation of the present invention should accomplish providing more signal to the motor as its rotation increases.

It is therefore a primary object of the present invention to provide a method and apparatus for supplying variable power to a stepper motor based upon the selected motor speed in order that the power supplied to the motor is approximately equal to the amount of power required and consumed by the motor at such speed, particularly when the motor is stationary or moving at low speeds.

It is also a primary object of the present invention to provide a method for establishing tables of correction values for use in controlling the amount of power delivered to a stepper motor in relation to the motor speed, each such table being tailored to the particular characteristics of the motor as well as its environment.

It is also a primary object of the present invention to provide a method and apparatus that supplies sufficient power to a stepper motor at different motor speeds to meet the requirements of the motor in order that the motor has sufficient torque to move to the position it is expected to be in so that no feedback is necessary from the motor to confirm such position.

It is another object of the present invention to avoid supplying unnecessary power to a stepper motor when the motor is stationary for long periods of time in order to avoid damaging the motor components.

It is another object of the present invention to provide a method for varying the amount of power supplied to a stepper motor using a table containing sets of correction values tailored to the particular motor and its environment, each set of values corresponding to a different motor speed or range of speeds, such that a different set of values is applied to the power delivered to the motor depending upon the motor speed.

It is another object of the present invention to provide a computer program for variably controlling the power supplied to a stepper motor by establishing and using a table containing sets of correction values tailored to the particular motor, each set corresponding to a different speed or range of speeds of the motor, in which different values from the table are used to provide power to the motor according to its speed by applying the factors to a single voltage available in the driving circuit using pulse width modulation.

It is another object of the present invention to avoid wasteful delivery of excess power to a stepper motor when it is at rest or moving at slow speeds.

It is another object of the present invention to provide a method and apparatus for maintaining more consistent control over the operation of a stepper motor so as to know the position of the motor at any given time without requiring feedback from the motor.

It is another object of the present invention to provide variable power to a stepper motor according to as set of motor-specific values contained in a look-up table by varying the length of time that pulses of single-voltage power are supplied to the motor using pulse width modulation.

It is another object of the present invention to sense and compensate for fluctuations in the voltage available in the drive circuit for a stepper motor using pulse width modulation.

Additional objects of the invention will be apparent from the detailed descriptions and the claims herein.

BRIEF DESCRIPTION OF THE DRAWINGS

FIG. 1 is a condensed sin ($\theta$) and cos ($\theta$) table with step values from a 256 entry table.

FIG. 3 is a table of pseudo-sine wave generation frequencies with increasing integer lookup rates.

FIG. 4 is a 2-page exemplary sample look-up table generated according to the present invention.

FIG. 5 is a plot of a sin wave having a maximum value of 255 in which the X-axis represents evenly spaced time increments, and the Y-axis represents the relative duration that power is supplied.

FIG. 6 is a plot of the sin wave of FIG. 5 having a maximum value of 255, scaled to 0.35 (35%).

FIG. 7 is a plot of the sin wave of FIG. 5 having a maximum value of 255, scaled to 0.39 (39%).

FIG. 8 is a plot of the sin wave of FIG. 5 having a maximum value of 255, scaled to 0.455 (45.5%).

FIG. 9 is a plot of the sin wave of FIG. 5 having a maximum value of 255, scaled to 0.473 (47.3%).

FIG. 10 is a plot of the sin wave of FIG. 5 having a maximum value of 255, scaled to 0.566 (56.6%).

FIG. 11 is a plot of the sin wave of FIG. 5 having a maximum value of 255, scaled to 0.649 (64.9%).

FIG. 12 is a plot of the sin wave of FIG. 5 having a maximum value of 255, scaled to 0.731 (73.1%).

FIG. 13 is a plot of the sin wave of FIG. 5 having a maximum value of 255, scaled to 0.814 (81.4%).

FIG. 14 is a plot of the sin wave of FIG. 5 having a maximum value of 255, scaled to 0.897 (89.7%).

FIG. 15 is a plot of the sin wave of FIG. 5 having a maximum value of 255, scaled to 0.98 (98%).

DETAILED DESCRIPTION OF THE PREFERRED EMBODIMENTS

Figure 2:
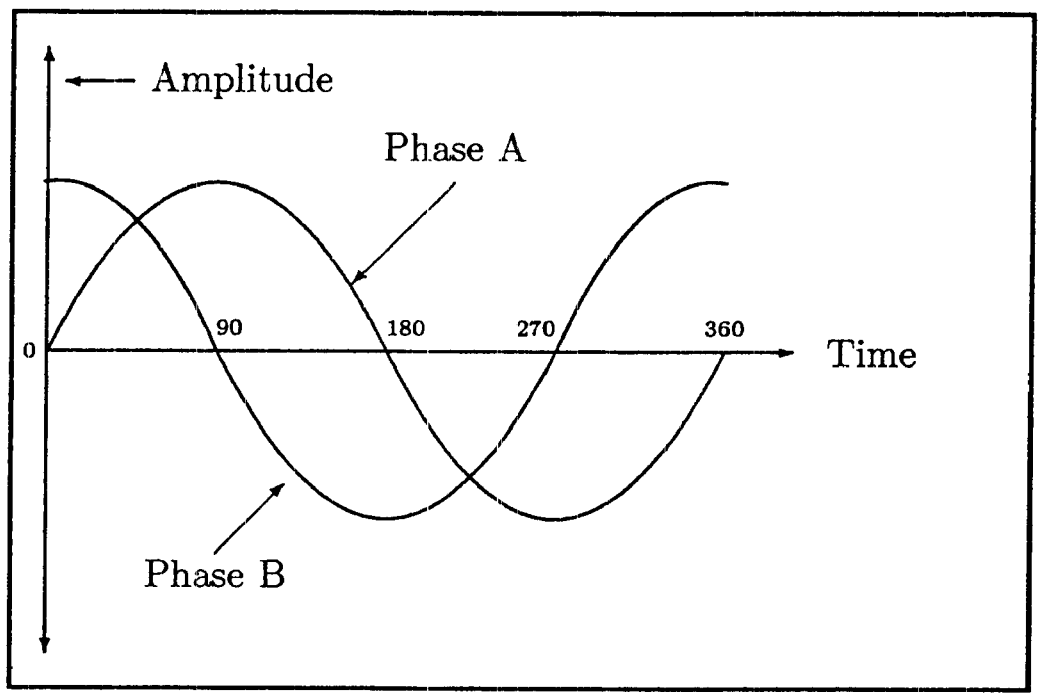
FIG. 2 is a graph showing clockwise sinusoidal waveforms for two phases as would be applied to two windings of a stepper motor.

Since a stepper motor moves in response to the rotating magnetic field that surrounds it, by changing the frequency of the rotating field it is possible to change the rotation rate. The amplitude of the signal provides only the force that is used to move the rotor. Thus, the amplitude of the driving signal controls the force, and the frequency of the driving signal controls the rotation rate. For most variable speed stepper motors, particularly stepper motors, in order to maintain an acceptable torque at a given speed (frequency) and for smoother operation of the motor, it is preferred that current be delivered to the motor winding according to a sinusoidal (sine or sin) curve. In an over-simplified example, for each "step" of the motor, a full sin curve is used. Thus, as the motor takes one full "step" the current delivered to a motor winding varies according to a full sin curve (sin ($\theta$)) from 0° to 360°. If additional windings are provided in the motor, these will require delivery of current in a different phase from the first winding, according to a shifted sin (i.e. cosine (cos)) wave. See FIG. 2. As an example, if a single step of a stepper motor is approximately 0.9°, a complete 360° rotation of the rotor will require 400 steps, and the full sin wave will be used 400 times for such a rotation.

The basic sin rate is the rate at which a pseudo-sine wave would be generated if a sin table were accessed at a constant rate with an increment of 1 (i.e. using each and every sin value sequentially). It is to be appreciated that the "pseudo" sinusoidal waves used in the Present invention are approximations of sin waves, which can mean digitized with limited number of bits or some other approximation from a simple digital look-up table such as a trapezoidal approximation or a triangle wave approximation. For computer simplicity, a sin table may be constructed having a number of entries that is a power of 2 (e.g. 256 entries). Thus, such a table would not have a discrete entry for each of the 360 degrees of a full step's movement. In this example (256 entries), there would be a table entry for every 1.4 degrees (360/256) of the 0.9° step. Accordingly, the rotor will move 0.9°/256=0.0035° for each table entry. A table having 512 entries would cause the rotor to move 0.9°/512=0.0018° for each table entry. If the computer timer interrupt rate is 10 KHz, this establishes a baseline table access frequency. If there are 256 entries in the table, the basic sin rate at the baseline frequency is 10,000/256=39.0625 Hz. This rate may be increased or decreased by multiplying or dividing the basic sine rate by natural or fractional numbers. FIG. 3 shows a table of pseudo-sine wave generation frequencies with increasing integer lookup rates.

It is known that the amount of inductive reactance from the motor is related to the resistance of the motor windings, the inductance of the motor, and the frequency or speed of rotation. The following formula (from Ohm's law) is instructive in this regard:

$$V=I(R+2\pi fL)$$

where V is the voltage in the drive circuit, I is the current, R is the resistance, f is the frequency, and L is the inductance. It is apparent from the above formula that when the frequency is zero, only the resistance R affects the voltage (assuming a constant current). However, as the frequency f increases, so does the inductive reactance ($2\pi fL$). By utilizing the known resistance R and inductance L of the motor, it is possible to generate a series of factors based on different frequencies f (i.e. different motor speeds) that correspond to the amount of inductive reactance that must be overcome for the motor to have proper power for full torque at the given speed. These factors are then multiplied by the sin value of the angle of the rotor in order to generate a table of values (a "look-up" table) that are approximately the same as the percentage of voltage required by the motor during rotation at the given speed.

As different speeds are selected by the user, sets of correction values for the particular selected speed are taken from the look-up table and applied to the power supplied to the motor. As the speed is increased or decreased, different sets of correction values are applied to the power output to the motor in order to keep the power supplied to the motor consistent with the power required and consumed by the motor. At very low speeds, significantly less power is required by the motor, and the available power is greatly reduced by the correction values applied, thereby avoiding waste (particularly when the motor is stationary for long periods of time). At increased speeds, more power is required by the motor, and application of the correction values in these speed ranges results in less of a reduction in power. At higher speeds, even more power is required by the motor, and application of the corresponding correction values results in little or no reduction in power.

For illustrative purposes and by way of example only, and without limiting the scope of the claims herein, a hypothetical list of correction factors may be established for a given motor in a given electrical environment containing a set of speed ranges. In this example, 16 speed ranges were arbitrarily selected, although any suitable number may be used. Based on the motor characteristics (e.g. inductance, resistance) and the electrical environment (e.g. available current and voltage), a different hypothetical correction factor has been determined for each of the 16 speed ranges, ranging from 35% to 100% as set forth below:

| Speed Range | Correction Factor % |
|---|---|
| 0 | 35.0% |
| 1 | 35.0% |
| 2 | 39.0% |

-continued

| Speed Range | Correction Factor % |
|---|---|
| 3 | 45.5% |
| 4 | 47.3% |
| 5 | 56.6% |
| 6 | 64.9% |
| 7 | 73.1% |
| 8 | 81.4% |
| 9 | 89.7% |
| 10 | 98.0% |
| 11 | 100.0% |
| 12 | 100.0% |
| 13 | 100.0% |
| 14 | 100.0% |
| 15 | 100.0% |

It is to be noted that the actual rotational speeds indicated by the entries in the above "speed range" columns are arbitrary and will be different based on the individual motor and its application; similarly, the actual correction factors are arrived at empirically as discussed more fully below, and must be custom figures which will be unique for each driver/motor/application combination. It is to be appreciated that different tables will be generated in accordance with the present invention for different motors, and that different tables may be generated for the same motor depending upon the number of speed ranges desired and the environment into which the motor is expected to be placed.

It should also be noted that the correction factors above are expressed as percentages of either the maximum voltage that the driving circuit may produce, or the time that the maximum voltage is turned on. It is not possible to produce more than 100% of the available voltage or current. Several of the speed ranges have the same correction factor, particularly at higher speeds. This is because for lower speeds, back EMF and reactance is low or non-existent such that the amount of power needed by the motor is correspondingly low; however, at higher speeds more power is needed—up to 100% at the very highest speeds. The correction factor for the slowest speed range is the smallest entry on the list. This assures that when the motor is at rest, it will consume only a very small amount of power.

According to the present invention, each of the correction factors in the above list is then used in combination with the sin (or cos, for the other winding phase) of the angle of the motor rotor to develop the actual look-up table of correction values for each speed range. In the example look-up table created from the above hypothetical example (FIG. 4), the list of correction factors are provided on an index across the top row, and a set of values related to the sin ($\theta$) for the rotor position (angle) are provided on an index down the left column.

In the example table of FIG. 4, sin values for only the first 180° are used since the sin values for the second 180° are identical, only negative as shown in the plots of FIGS. 5–15. Compensating for the negative numbers in the second 180° is a simple matter of software programming so as to avoid an unnecessarily large look-up table. In addition, instead of providing an entry for each discrete angle of the 180° represented, only 128 entries are provided for efficient use of computer memory. The 128 positive entries and another 128 negative entries provides the total of 256 entries. Of course, if computer memory were unlimited, in an unrestricted environment more entries could be provided (e.g., one table entry for each angle, or one table entry for a given fraction of each angle). The column of sin values in the table (column 2) have been multiplied by 255 and then rounded to the nearest integer for ease of computer use (column 3). Thus, the third column represents an index of whole numbers from 0 to 255 corresponding to the sin of the rotor angle between 0° and 180°. The sin values in the third column are multiplied by the correction factors at the top of each of the columns (16 speed ranges) resulting in a table containing sets (columns) of correction values for each speed range.

It is to be appreciated that only the two indexes (the correction factors for each speed range, and the pseudo-sin values of the third column) may actually be stored in memory. The full table itself is not necessarily created. Thus, the table values are generated by multiplying the indexes together as needed. However, it is preferred that the look-up table be pre-generated and stored (e.g. in ROM) to save processor calculation time during motor operation.

In the preferred embodiment, the values in the table are applied to a maximum available voltage (i.e., the only available voltage) using pulse width modulation (PWM) to provide such voltage to the electric motor for a percentage of time. The time is thereby adjusted (using values from the look-up table) to a level that results in delivery of power that is approximately equal to the amount of power required by the motor in the given speed range. As the speed range changes, different values are taken from the table according to the changed speed range which are then used to change the amount of time that power is supplied, thereby keeping the power supplied to the motor approximately equal to the power consumed/required by the motor, particularly at lower speeds. This provides for more consistent control of the motor.

Alternatively, as discussed above, the values in the look-up table may be used to vary the voltage level supplied to the motor (if that is possible) for the same controlling effect; or the table values may be used in a combined variance of both the time and voltage level for the same controlling effect.

The rotor is started and kept in motion by continuously passing through a column of the look-up table that corresponds to the given speed. This is necessary because of the constantly changing angle of rotation of the rotor. If the speed changes, values are taken from a different column of the look-up table corresponding to the new speed.

For illustrative purposes only and by way of example, if the speed range is 6, then the eighth column of the exemplary sample table of FIG. 4 will be used, having a correction factor (in the first row index) of 0.649. As the rotor moves through each micro step (i.e., a full sin curve) at this speed, the values in this column (eighth) will be used over and over in order. Taking a snapshot when the applied signal corresponds to an angle of approximately 520, the sin value for this angle is 0.788 which, when multiplied by 255 and rounded to the nearest integer, provides the value 201 found in the second column (line 38). Stated differently, taking a snapshot at line 38 on the table, the sin value is 0.788 which is multiplied by 255 and truncated to 201. The 201 figure is multiplied by the 0.649 correction value resulting in the correction factor of 130 in the column for speed range 6 of the look-up table. The 130 value represents a percentage of 255 (i.e., 130/255=51%). Thus, at the snapshot of the 52° angle, 51% of the voltage available in the drive circuit is applied to the motor winding. This is done using PWM such that for a given time period, the voltage is supplied for 51% of that period. In an alternative embodiment, where the voltage itself may be varied, only 51% of the available voltage would be applied constantly (i.e., all relevant times) during the 52° angle.

The purpose of the present invention is to provide efficient operation of a stepper motor at various speeds. It is the hardware that actually supplies, for example, a two-phase stepper motor by changing the duration of the voltage applied to the motor windings. The two windings are physically 90° out of phase, with the first winding receiving a sinusoidal signal that is 90° out of phase with that being applied to the second winding. This relationship is usually called a sin/cos relationship of signals. Thus, using the example correction factors above, a similar look-up table can be created for the second motor winding. The calculations in the first column of such a table would be based on the cosine (cos) of the angle. Thus, in such a table, a duration value of 102 is sent to the next phase winding of the motor at this 52° angle (i.e., cos (52)×255×0.649=101.889 rounded to 102). Alternatively, to find the cos value for the other winding which corresponds to the sin value previously found for the first winding, one simply indexes through the table 90° (which is 64 steps through the table). This leads to line 102 (38+64=102). The sin value of 0.615×255=157 which is multiplied by 0.649=102. The duration 102/255= 40% which is either 40% of the time via PWM, or 40% of the voltage itself.

Because of real time limitations in microprocessors, it is advantageous to perform as many calculations as possible in advance, and download them to the processor prior to operation. Thus, the look-up table may include the pre-calculated products of the correction factors multiplied by the pseudo-sinusoidal wave factors converted to percentages. In the example above, the values in the table of FIG. 4 are rounded to the closest whole number to allow the microprocessor to perform calculations using integer values. The number of values in the sin column can be a power of 2 (e.g. 64, 128, 256, 512, etc.) to more easily facilitate masking and other computer processor-related tasks.

It is necessary for the motors controlled by the present invention to be able to turn in both clockwise and counter-clockwise directions. It is possible to reverse the direction of such a motor by simply reversing the phase relationships of the motor windings (i.e. changing the sign of the magnetic field from positive to negative, or vice versa). However, such a change in phase (sign) often results in a discernable "jump" of the moving motor. The present invention solves this problem by simply changing the direction through which the pseudo-sin table is accessed. Accordingly, in order to cause the rotor to rotate clockwise, the power correction values are provided by continuously going forward through a column of the look-up table of FIG. 6 (with table wrap), the particular column being associated with the selected motor speed. The values are provided over and over as long as the motor is moving, corresponding to the angle of the position of the motor rotor. To change direction and rotate rotor counterclockwise, the values are provided by going backwards through the appropriate column of the look-up table associated with the motor speed. This avoids any discernable "jump" as rotor direction is changed. Similarly, changing motor speeds (in the same direction) simply involves moving from one column to another. By using the pre-determined correction values of the present invention, such speed transitions are extremely smooth. When the rotor is motionless, a single value from the fourth column is used for each winding corresponding to the angle of the rotor in its stationary position.

The design of the present invention is usable with synchronous variable speed DC motors, and is specifically designed for stepper motors. Stepper motors typically have two or more sets of induction coils (windings), thereby requiring switching of the DC supply to produce variable speed multiphase sine/cosine waves (see FIG. 4). The present invention may be used on either a unipolar or bipolar stepper motor drive. The present invention can generate as many tables as there are windings (phases) in the motor. Of course, repetitive or similar tables may not be necessary (e.g. supplying values for only 180°) since these can easily be compensated for in software.

Preferably, the values in the look-up table are generated such that a given value is multiplied by an established time increment in order to provide the varied power supplied to the motor circuit. However, these values may be established such that they are divided by or into an established time increment to obtain the desired power variance; or the values may be established such that they are added to or subtracted from an established time increment to obtain the desired power variance.

Many custom variations and modifications may be made to the indexes of the table generated according to the present invention. Although the example list provided above contains 16 different speed ranges resulting in 16 different correction factors and 16 different columns, any appropriate number of speed ranges may be selected for this index resulting in a corresponding number of correction factors and columns. The number of speed ranges selected will depend upon such things as the capabilities of the motor itself, the potential speed(s) at which it is expected to be operated, and the electrical environment into which it will be deployed. Similarly, the number of entries in the sin index may be established depending upon the desired fineness (resolution) of the sin curve. The example table of FIG. 6 contains 128 entries in the sin index, but a larger or smaller table could be developed having 64, 128, 256, 360, 512, or any other number of entries in the index.

As an example of an alternative IV table, a very simple generic list of 16 correction factor is set forth below:

| Speed Range | Applied Frequency | Correction Factor |
| --- | --- | --- |
| 0 | 0 | .500 |
| 1 | 39 | .500 |
| 2 | 78 | .500 |
| 3 | 117 | .500 |
| 4 | 156 | .500 |
| 5 | 195 | .583 |
| 6 | 232 | .666 |
| 7 | 270 | .749 |
| 8 | 312 | .832 |
| 9 | 345 | .915 |
| 10 | 390 | 1.00 |
| 11 | 434 | 1.00 |
| 12 | 476 | 1.00 |
| 13 | 500 | 1.00 |
| 14 | 547 | 1.00 |
| 15 | 587 | 1.00 |

It is to be appreciated that the above list of factors is not associated with any particular motor or environment, but instead provides a universal list of factors that may be successfully applied in many motor applications. This list acknowledges that a small but relatively constant drive signal is required for the stationary and low speed levels 0–4. This is because at low frequencies f, the motor's resistance R is dominant and is relatively constant. In this case, the correction factor at these speeds is 50%. Then, at very high speed levels 10–15, the frequency component (2πfL) is dominant, requiring delivery of all available power, so a correction factor of 1 (100%) is used. The remaining speed levels 5–9 are stair-stepped in approximately equal increments of 0.083 from 0.5 to 1.0. These factors are then placed in the index of the look-up table to be multiplied by the sin values in the first column, resulting in 16 new columns of pseudo-sin values used as described above.

In an alternative embodiment, the factors in the table may be used to vary the actual voltage supplied to the motor, as compared to varying the time a set voltage is supplied. Again, the factors in the table may be established such that they are either multiplied by, divided by or into, added to or subtracted from the voltage in order to provide the desired power variance.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. A method for controlling the power supplied to at least one winding of a stepper motor comprising the steps of:
   a. determining the reactance of the at least one motor winding;
   b. determining the amount of voltage available in a drive circuit to the motor;
   c. selecting a set of speed ranges for the motor;
   d. establishing a correction factor for each speed range for the motor based on the reactance of the motor winding and the voltage available in the drive circuit;
   e. establishing a set of factors based on a pseudo-sinusoidal wave;
   f. multiplying each correction factor by each of the pseudo-sinusoidal wave factors to create a table of application factors;
   g. selecting a speed of rotation for the motor; and
   h. supplying current to the motor winding in varying amounts according to the application factors in the table for the selected speed without receiving feedback from said motor.

2. The method of claim 1 wherein the table of application factors is generated in real time by multiplying each correction factor by each of the pseudo-sinusoidal wave factors and supplying current to the motor according to the products of these factors.

3. A method for controlling the power supplied to at least one winding of a stepper motor comprising the steps of:
   a. determining the reactance of the at least one motor winding;
   b. determining the amount of voltage available in a drive circuit to the motor;
   c. selecting a set of speed ranges for the motor;
   d. establishing a correction factor for each speed range for the motor based on the reactance of the motor winding and the voltage available in the drive circuit;
   e. establishing a set of factors based on a pseudo-sinusoidal wave;
   f. multiplying each correction factor by each of the pseudo-sinusoidal wave factors to create a table of application factors;
   g. selecting a speed of rotation for the motor; and
   h. supplying current to the motor winding in varying amounts according to the application factors in the table for the selected speed wherein the table of application factors is generated in real time by multiplying each correction factor by each of the pseudo-sinusoidal wave factors and supplying current to the motor according to the products of these factors and wherein each of the sinusoidal factors and each of the application factors are rounded to integers.

4. The method of claim 2 wherein the step of supplying varying amounts of current to the motor winding is accomplished by changing the amount of time the current is supplied according to the application factors for the given speed using pulse width modulation.

5. The method of claim 2 wherein the step of supplying varying amounts of current to the motor winding is accomplished by varying the amount of voltage supplied according to the application factors for the given speed.

6. The method of claim 2 further comprising steps of changing the speed of rotation of the motor, and supplying current to the motor according to the application factors for the changed speed.

7. The method of claim 6 wherein a position of the motor can be determined based on the power supplied to the motor according to the current application factor.

8. The method of claim 2 wherein said motor has a second winding that is orthogonal to the first winding, and a second table is established for said winding, said table being generated using pseudo-sinusoidal factors that are ninety degrees out of phase from the first table.

9. A method for controlling the power supplied to a motor winding comprising the steps of
   a. selecting a set of speed ranges for the motor;
   b. establishing a correction factor for each speed range for the motor, the first one third of said correction factors being 50%, the last one third of said factors being 100%, and the middle one third of said factors being evenly incrementally spaced between 50% and 100%;
   c. establishing a set of factors based on a pseudo-sinusoidal wave;
   d. multiplying each correction factor by each of the pseudo-sinusoidal wave factors to create a table of application factors;
   e. selecting a speed of rotation for the motor; and
   f. supplying current to the motor winding in varying amounts according to the application factors in the table for the selected speed.

10. The method of claim 9 wherein the table of application factors is generated in real time by multiplying each correction factor by each of the pseudo-sinusoidal wave factors and supplying current to the motor according to the products of these factors.

11. The method of claim 10 wherein each of the sinusoidal factors and each of the application factors are rounded to integers.

12. The method of claim 10 wherein the step of supplying varying amounts of current to the motor winding is accomplished by changing the amount of time the current is supplied according to the application factors for the given speed using pulse width modulation.

13. The method of claim 10 wherein the step of supplying varying amounts of current to the motor winding is accomplished by varying the amount of voltage supplied according to the application factors for the given speed.

14. The method of claim 10 further comprising steps of changing the speed of rotation of the motor, and supplying current to the motor according to the application factors for the changed speed.

15. The method of claim 14 wherein a position of the motor can be determined based on the power supplied to the motor according to the current application factor.

16. The method of claim 10 wherein said motor has a second winding that is orthogonal to the first winding, and a second table is established for said winding, said table being generated using pseudo-sinusoidal factors that are ninety degrees out of phase from the first table.

17. An apparatus for controlling the amount of power delivered to an electric stepper motor according to its speed comprising a stepper motor having at least one winding, a drive circuit having an input voltage and current, a microprocessor in communication with said drive circuit and said motor, and a table of application factors created from the products of a set of speed correction factors and a set of pseudo-sinusoidal wave factors, wherein said microprocessor uses said application factors to vary the current supplied to the motor according to the selected speed of the motor without receiving feedback from said motor.

18. The control apparatus of claim 17 wherein the speed correction factors are developed from the reactance of the motor winding and the voltage available in the drive circuit.

19. The control apparatus of claim 18 wherein the table of application factors is generated in real time by multiplying each correction factor by each of the pseudo-sinusoidal wave factors and supplying current to the motor according to the products of these factors.

20. An apparatus for controlling the amount of power delivered to an electric stepper motor according to its speed comprising a stepper motor having at least one winding, a drive circuit having an input voltage and current, a microprocessor in communication with said drive circuit and said motor, and a table of application factors created from the products of a set of speed correction factors and a set of pseudo-sinusoidal wave factors, wherein said microprocessor uses said application factors to vary the current supplied to the motor according to the selected speed of the motor, wherein the speed correction factors are developed from the reactance of the motor winding and the voltage available in the drive circuit, wherein the table of application factors is generated in real time by multiplying each correction factor by each of the pseudo-sinusoidal wave factors and supplying current to the motor according to the products of these factors, and wherein the step of supplying varying amounts of current to the motor winding is accomplished by changing the amount of time the current is supplied according to the application factors for the given speed using pulse width modulation.

21. A method for controlling the speed of an electric motor by varying the power supplied to the motor comprising the steps of:
   a. providing a motor rotational speed command;
   b. retrieving a correction factor from a first table, said correction factor corresponding to the provided motor speed command, said table containing correction factors for different motor speeds based on the reactance of a winding of said motor;
   c. multiplying said correction factor by each of a set of pseudo-sinusoidal factors from a second table, each of the factors in said second table corresponding to an angle of a rotor of said motor in relation to said winding;
   d. supplying variable power to said motor winding without receiving feedback from said motor according to the product of said retrieved correction factor and each of the pseudo-sinusoidal factors as said rotor rotates, the retrieval of said pseudo-sinusoidal factors from said second table corresponding to the presumed angle of said rotor as it rotates.

22. The method of claim 21 wherein the step of supplying variable power to the motor winding is accomplished by changing the amount of time the power is supplied according to the product of the stated factors for the given speed command using pulse width modulation as said rotor rotates.

23. The method of claim 21 wherein the step of supplying variable power to the motor winding is accomplished by changing the amount of voltage supplied according to the product of the stated factors for the given speed command as said rotor rotates.

24. The method of claim 21 further comprising steps of providing a different motor speed command, retrieving a new correction factor from said first table corresponding to the different motor speed command, and supplying power to the motor according to the product of the new correction factor and each of the pseudo-sinusoidal factors as said rotor rotates.

25. The method of claim 21 wherein said motor has a second winding that is orthogonal to the first winding, and a third correction factor table is established for said second winding based on the reactance of said winding, and power is supplied to said second winding according to the product of the correction factor from said third table corresponding to the speed command and each of the pseudo-sinusoidal factors from said second table taken ninety degrees out of phase from those used with the first winding.

26. A method for controlling the speed of an electric motor by varying the power supplied to the motor comprising the steps of:
   a. establishing an electronic look-up table made up of a set of products of a set of correction factors for different motor speeds and a set of pseudo-sinusoidal wave factors, the correction factors corresponding to different potential motor speeds and being based on the reactance of a winding of said motor, the pseudo-sinusoidal wave factors corresponding to an angle of a rotor of said motor in relation to said winding;
   b. selecting a rotational speed for the motor; and
   c. supplying variable power to said motor winding without receiving feedback from said motor according to the products in said look-up table for the selected speed corresponding to the presumed angle of said rotor as it rotates.

27. The method of claim 26 wherein the step of supplying variable power to the motor winding is accomplished by changing the amount of time the power is supplied according to the products in said look-up table for the selected speed using pulse width modulation.

28. The method of claim 26 wherein the step of supplying variable power to the motor winding is accomplished by changing the amount of voltage supplied according to the products in said look-up table for the selected speed as said rotor rotates.

29. The method of claim 26 further comprising steps of selecting a different rotational speed for said motor, and supplying power to the motor according to the products in said look-up table corresponding to the different selected speed as said rotor rotates.

30. The method of claim 26 wherein said motor has a second winding that is orthogonal to the first winding, and a second look-up table is established for said second winding based on the reactance of said winding and pseudo-sinusoidal factors that are ninety degrees out of phase from those used in said first look-up table, and power is supplied to said second winding according to the products in said second look-up table corresponding to the selected speed as said rotor rotates.

* * * * *

UNITED STATES PATENT AND TRADEMARK OFFICE
CERTIFICATE OF CORRECTION

PATENT NO. : 6,670,783 B2 Page 1 of 1
DATED : December 30, 2003
INVENTOR(S) : Glenn Waehner and William Eric Hamilton It is certified that error appears in the above-identified patent and that said Letters Patent is hereby corrected as shown below:

<u>Column 4,</u>
Line 32, "fequified" should be -- required --
Line 34, "bum out" should be -- burn out --

<u>Column 5,</u>
Line 43, "as set of" should be -- a set of --

<u>Column 8,</u>
Line 18, "columns" should be -- column --

<u>Column 10,</u>
Lines 50 - 51, "rotate rotor" should be -- rotate the rotor --

Signed and Sealed this

Twenty-fifth Day of May, 2004

JON W. DUDAS
*Acting Director of the United States Patent and Trademark Office*